Feb. 2, 1965  M. A. GAARE  3,168,171
LAMINATED SHEET METAL NUT
Filed Dec. 26, 1961  2 Sheets-Sheet 1
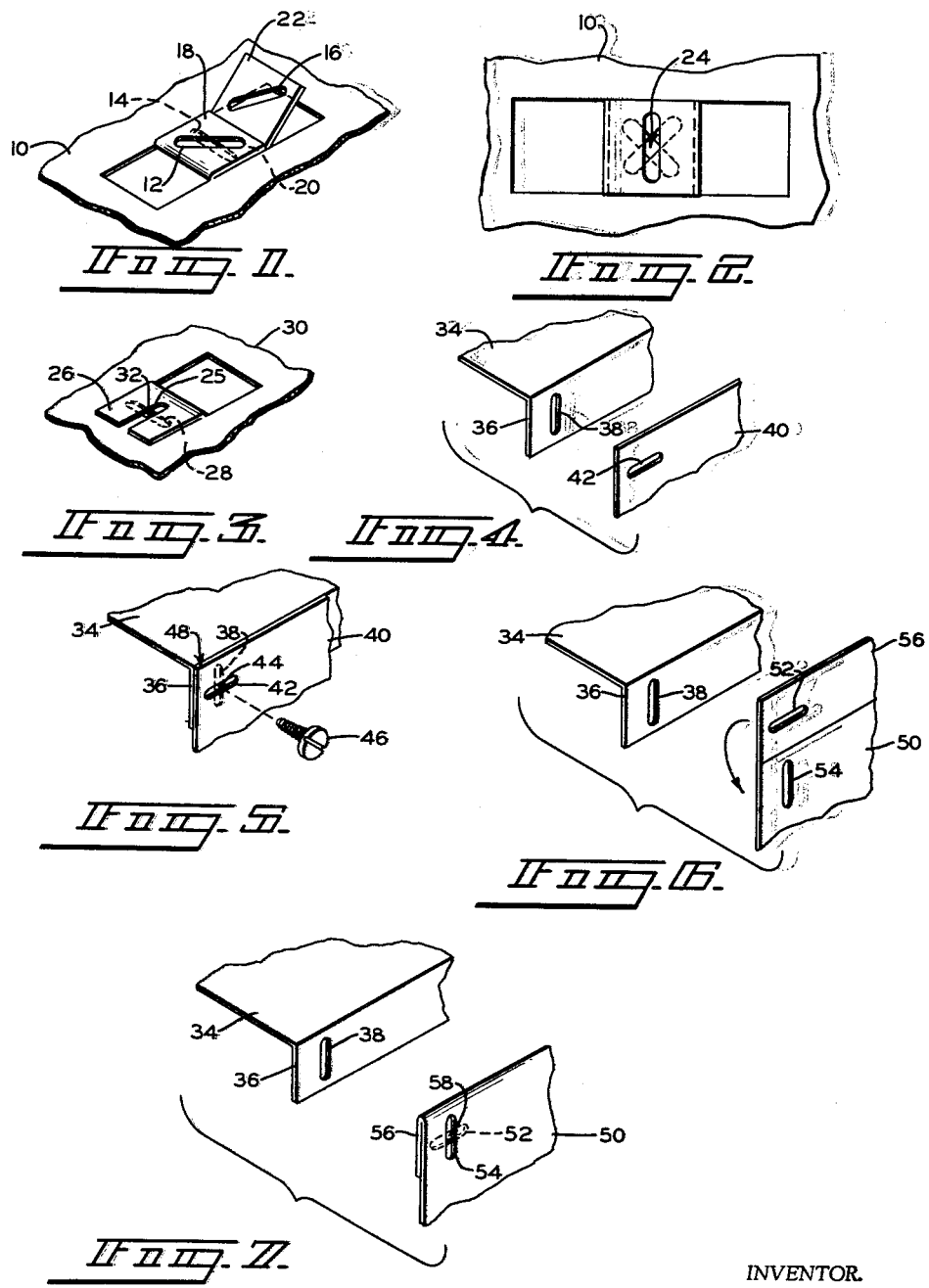
INVENTOR.
MELVIN A. GAARE
BY
*Alfred L. Wilson*
ATTORNEY Feb. 2, 1965   M. A. GAARE   3,168,171
LAMINATED SHEET METAL NUT
Filed Dec. 26, 1961   2 Sheets-Sheet 2
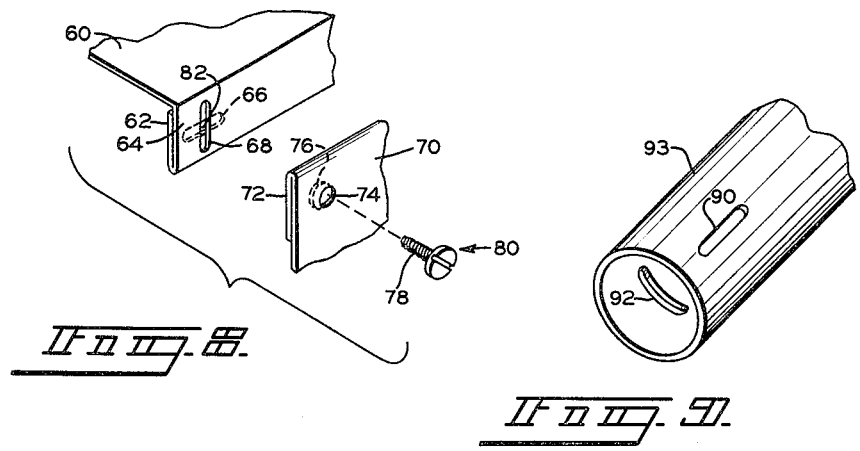
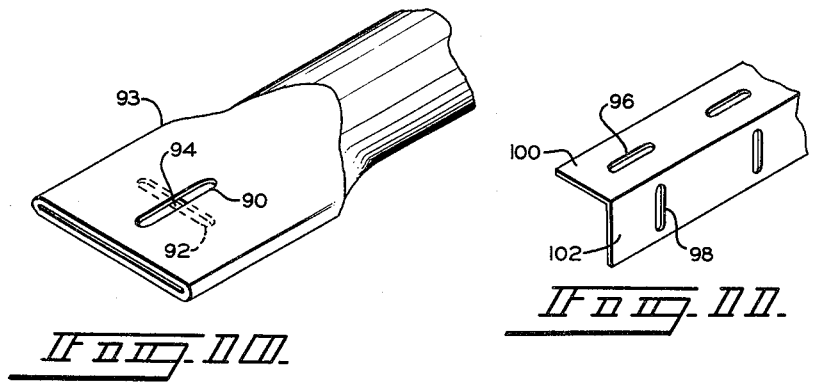
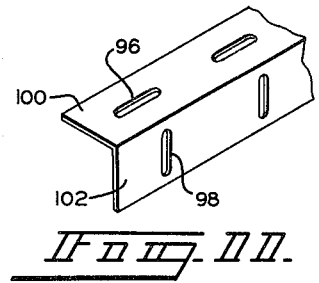
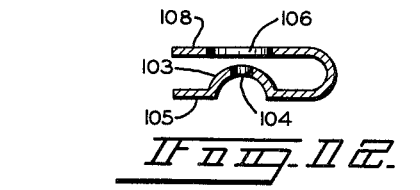
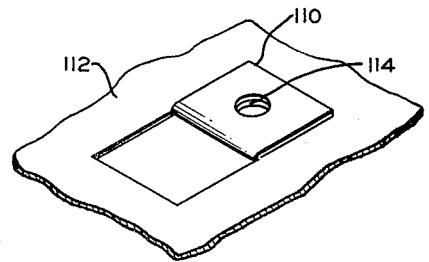
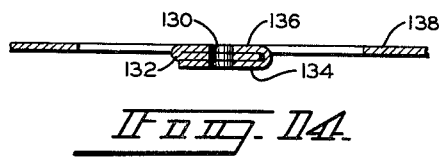
INVENTOR.
MELVIN A. GAARE
BY
Alfred E. Wilson
ATTORNEY

United States Patent Office 3,168,171
Patented Feb. 2, 1965

3,168,171
LAMINATED SHEET METAL NUT
Melvin A. Gaare, 610 E. Farnum, Royal Oak, Mich., assignor of fifty percent to Alfred E. Wilson, Dearborn, Mich.
Filed Dec. 26, 1961, Ser. No. 161,967
5 Claims. (Cl. 189—34)

This invention relates to self-locking, laminated sheet metal nuts and to their production, and more particularly to laminated sheet metal nuts of greater simplicity, greater economy of manufacture, and greater holding power; and to their production either as distinct units or as integral portions of sheet metal panels or strip stock, of which they are formed.

In the prior art, the fastening of sheets of metal together has generally been effected by the use of sheet metal screws; bolts and nuts; threaded, bolt or screw-receiving apertures, such as bolts welded to the sheet; or the like. This type of fastening has enjoyed wide popularity because of its versatility. However, it is a substantially expensive item according to present methods and costs of manufacturing, requiring the operations of hole and thread formation. Of course, it is known that sheet metal screws form their own threads and that there are self-tapping screws available. However, the holding power of such items in thin stock is limited, as is well known, and accordingly nuts of appreciable body have been used where highest torques and holding strengths are required.

Also, when utilizing the prior art fasteners, it has been necessary to drill or punch the sheet stock to be assembled, so that the screw or bolt can be passed through to engage the nut on the other side. Particular reference is made to the assembly of fenders and the like to automobiles. As is well known, manufacturing tolerances require substantial adjustability between parts because the parts are not all identical. Thus it has been common practice to use relatively large holes in the fender to accommodate the screw or bolt to the threaded aperture or bolt formed on the supporting frame or part. In many instances, the parts are first positioned together, then drilled to assure alignment. It will accordingly be understood that the prior art methods of fastening have required substantial hand fitting or jockeying of parts to position. Also, the expense of prior fasteners such as threaded nuts is well known.

Accordingly, if a highly simplified, inexpensive, and versatile sheet metal nut could be provided that would automatically accommodate manufacturing tolerances, and if a method of fastening sheet metal panels together could be provided wherein tolerance compensation was automatically provided, a substantial step forward in the art would be provided.

Accordingly, it is an important object of the present invention to provide a novel self-locking laminated sheet metal nut and method for its manufacture.

Another object is to provide a novel self-locking sheet metal nut that can be made as a separate unit, or integrally in a sheet of metal which it is adapted to secure.

A still further object is to provide a method for producing self-locking sheet metal nuts in a simplified and highly economical manner by the expedient of removing or omitting stock.

A still further object is to provide a method for securing sheet metal parts together wherein the nut or fastener is an integral part of each of the members to be secured in assembled relation.

A further object is to provide a novel sheet metal nut that is integral with a sheet of mother material from which it is formed, by folding tabs of the mother material to at least two thicknesses and providing, crossover slots in the respective thicknesses of metal, for holding a sheet metal screw or bolt in self-threading and self-locking relation.

A further object is to provide an improved self-locking sheet metal nut by piercing and folding on one another from a sheet of mother material, one or more tabs and providing the tabs with cross-over slots that cooperate to form the nut, with the edges of the slots defining an aperture capable of exerting self-locking tension on a bolt of screw thread for locking the same against loosening.

A further object is to provide a method for forming sheet metal nuts integrally in a sheet of metal by piercing slotted tabs from the sheet, leaving one edge of the tab integral with the sheet, and folding the tabs over one another to cross the slots and provide a thread-locking aperture.

A further object is to provide a novel self-locking strip nut.

Another object is to provide a method of producing self-locking strip nuts.

Another object is to provide sheet metal nuts by folding at least two thicknesses of sheet metal and providing aligned apertures therein for receiving a bolt or screw in thread-locking relation.

A still further object is to provide an edge-reinforced sheet of metal with self-locking nuts formed integrally in said edge by cross-over slots formed in the several thicknesses of metal.

Other objects of this invention will appear in the following description and appended claims, reference being had to the accompanying drawings forming a part of this specification wherein like reference characters designate corresponding parts in the several views.

In the drawings:

FIGURE 1 is a fragmentary perspective view showing a cross-over slot form of self-locking sheet metal nut of the present invention in the process of manufacture as an integral part of a metal panel;

FIGURE 2 is a top plan view of FIGURE 1, as completed;

FIGURE 3 is a fragmentary perspective view of a second embodiment of the cross-over slot form of self-locking sheet metal nut of the present invention;

FIGURE 4 is a fragmentary isometric view showing formation of sheet metal nuts of the present invention wherein cooperating slots are formed in to-be-assembled edges of 2 sheet metal panels;

FIGURE 5 is an assembled view of FIGURE 4, before application of a sheet metal screw;

FIGURE 6 is a fragmentary isometric view showing the first step of formation of triple-thickness nut, wherein panel edges are slotted and the lower panel scored for folding;

FIGURE 7 shows the manner in which the upper edge of the lower panel of FIGURE 6 is folded before assembly to provide a smooth edge and nut component formation;

FIGURE 8 is an isometric view showing the novel nut of invention formed by slotting and folding an edge of a first sheet metal panel, and utilizing enlarged holes in a second panel edge to provide adjustability;

FIGURE 9 is a fragmentary isometric view showing the formation of cross-over slots in the end of a tube as the first step in the formation of a nut of invention;

FIGURE 10 shows the tube end of FIGURE 9 flattened to complete the tube-end nut;

FIGURE 11 illustrates the manner in which a nut of invention can be formed by slotting an angle iron, before flattening, to form a brace end, with self-contained nut;

FIGURE 12 is a section view of a push-on type nut using cross-over slots for clip-on retention;

FIGURE 13 is a perspective view of an aligned aperture form of self-locking sheet metal nut, made in accordance with the invention; and FIGURE 14 is a section view of a triple thickness aligned aperture, laminated sheet metal nut, similar to FIGURE 12.

Perspective view

Briefly, the present invention relates to a laminated sheet metal nut and method of forming the same by providing elongated slots in at least two thicknesses of metal which are adapted to cross over one another when superimposed, to provide a thread-forming, self-locking thread-receiving aperture.

The present laminated nuts can be formed as separate units or they may be formed integrally with sheet materials by the simple expedient of folding tabs of the material on one another and leaving a portion of one of the tabs secured in or to the sheet metal. Further, the concept is extensible to the formation of nuts in tubular bodies and in angle stock and strip stock as well as in sheet stock.

The laminated nut consists of a panel or strip of sheet metal, a portion of which is pierced on three sides to permit folding the tab over with respect to the panel or strip to provide a multiple thickness locking device wherein each thickness of material has an elongated slot so proportioned that when folded to the bent-over position, the slots are arranged in crossover relation relative to each other. This multiple thickness nut provides a locking device that is much stronger than is formed by an aperture in a single sheet because, when the metal is bent over and the slots intersect and the screw is inserted, the device is locked. The screw urges the sheet metal member toward each other, but the sheet metal members do not accurately align with each other over their entire engaging surfaces. As a result, a degree of tension is exerted on the screw which insures against loosening of the screw. This is analogous in many respects to the use of a washer with a sheet metal panel or strip.

When a series of slotted bent-over tabs are formed in a panel, the resulting nuts or fasteners are twice as thick as the panel and no additional metal is required in addition to the metal of the panel or strip from which the bent-over tabs are formed.

In the light of this brief description, a more detailed explanation of the invention in its various embodiments will now follow.

The embodiments of FIGURES 1 and 2

As shown in FIGURE 1, a nut of invention is formed from a sheet of metal 10. As a first step in forming the nut illustrated, the sheet is provided with angularly related slots 12, 14 and 16. If this figure of the drawing be visualized while the tabs 18 and 22 are still flat in the sheet of mother material, it will be seen that the slots are oriented at 60° with one another. Thus, when the tabs 18 and 22 are pierced and folded over the mother tab 20, the apertures will cross over each other as in FIGURE 2 to provide a self-locking thread-receiving aperture 24.

Operation of the embodiment of FIGURES 1 and 2

It has been found that when a sheet metal screw is threaded through the aperture 24 of FIGURE 2, an extremely high tensile nut of high self-locking power is provided.

The embodiment of FIGURE 3

As shown in FIGURE 3, an alternate form of crossover slot-type, self-locking sheet metal nut of the present invention can be provided by forming an open ended slot 25 in the tab 26 and folding the tab 26 containing this open-ended slot into superimposed relation over a closed end slot 28 formed in the mother sheet 30. In this embodiment of the invention, the closed end slot 28 and the open end slot 24 have a 90° orientation with respect to each other. By so operating, a self-threading aperture 32 is formed which displays the same high tensile characteristics as formed by the triple cross-over configuration of FIGURES 1 and 2. The double thickness unit of FIGURE 3 is highly effective, and when appropriate metal thickness is utilized, in combination with an appropriate thread pitch, an extremely versatile and highly effective self-locking nut is provided.

The embodiment of FIGURES 4 and 5

As shown in FIGURES 4 and 5, the sheet metal nut of the present invention has the component parts thereof formed in the respective edges of two different sheets of material that it is desired to join. Accordingly, in FIGURE 4, a first sheet 34 is provided with a fold over edge 36 that has, for the sake of description a vertically extending slot 38. Of course, it will be obvious that the slot 38 configuration will be repeated along the edge 36 at appropriate fastening intervals.

Similarly, the upper edge of the sheet 40 is provided with a horizontal slot 42 that is oriented 90° away from the slot 38 of fold-over edge 36.

As shown in FIGURE 5, when the sheets are superimposed one upon the other for assembly and a sheet metal screw 46 inserted and tightened, the two slot components 38 and 42 are drawn together in an integral nut in extremely effective, self-locking configuration, providing an extremely effective laminated nut by the mere expedient of removing stock from two sheets of metal to be joined. The unexpected result of the present invention is believed to be self-evident by the fact that a sheet metal nut of unexpectedly high holding power is formed by the omission of material.

Also, by reference to FIGURES 4 and 5, it will be observed that a substantial amount of adjustability for the panels one with the other is automatically provided by the cross-over slot configuration. Thus, the misalignment of the cross-over slots provides for vertical or lateral adjustment or a combination of such, in short in a full circle, and still provide the thread forming aperture 44 for receiving the sheet metal screw 46. In this regard, a completely finished assembly is provided by the mere expedient of providing the sheet metal screw 46 with a head sufficiently big to completely cover the slot 42.

The modification of FIGURES 6 and 7

It will be noted in FIGURES 4 and 5 that a raw edge 48 was provided along the top of the front sheet 40. This is quite satisfactory where the sheet 40 is hidden as on the back of an appliance or automobile fender or the like. However, where it is desired to provide a dressed edge, as when assembling a front panel to an appliance, the procedure of FIGURES 6 and 7 can be employed.

Thus, as shown in FIGURE 6, the upper sheet 34 is folded as at 36 and slotted vertically as at 38, in the same manner as shown in FIGURES 4 and 5. However, the lower sheet 50 is given a slight amount of added treatment in the form of angularly related slots 52 and 54 in such relation to each other so that when the edge 56 is folded over as in FIGURE 7, the slots 52 and 54 will be superimposed in cross-over fashion to form a thread-forming aperture 58.

Thus, when the lower sheet 50 is positioned in assembled relationship with the sheet 34 to bring the thread forming aperture 58 into alignment with vertically disposed slot 38, a triple thickness nut will be formed by the passage of a sheet metal screw through the opening 58 and thence through the slot 38.

The highly effective triple thickness-type nut disclosed in FIGURES 1 and 2 will thereby be provided, giving extremely high tensile retaining power and highly effective self-locking properties.

As regards the modification of FIGURE 7, it will be noted that the lower panel 50 can be adjusted vertically the length of slot 38 for alignment during assembly. If it is desired to provide lateral adjustability instead, the configuration of the three slots 52, 54 and 38 is merely indexed 90°. This would place the slot 38 horizontal and thus the panel 50 could then be adjusted laterally with respect to the panel 34.

Where universal adjustability is desired with the modification of FIGURES 6 and 7, as is provided in the FIGURES 4 and 5 embodiment, it is to be considered within the scope of the invention to fold the sheet 50 as at 56 prior to slot formation and then provide aligned slots through both thicknesses of material with the slot in the upper panel being angularly related thereto, as for example like the 60° showing of FIGURES 1 and 2 or the 90° showing, illustrated in FIGURES 4 and 5. The reason why this slotting and double thicknesses of material is not preferred, is that when a punch is pushed through two thicknesses of metal, it is effective to dislodge a slug from the top sheet that then drives through the second sheet making a flared hole of somewhat ragged configuration. Thus, to keep the operation clean and workmanlike, it is preferred to slot the individual thicknesses. However, the broad scope of the invention would include the punching of a common slot through two thicknesses of metal and superimposing this punched material upon another thickness of metal with an angularly related slot to give the universally adjustable feature.

As regards the punching of the slots 52 and 54 as in FIGURE 6, where the punching operation is effected from for example the front side of the sheet, any burr edges will be protruded from the backside. By reference to FIGURE 7, it will be noted that any burr on the back of the slot 52 will be folded inwardly so that the burrs face each other in the fold 56, 50 and are thereby covered to present smooth outward appearance. Thus, a neat and workmanlike job is provided.

The embodiment of FIGURE 8

As shown in FIGURE 8, a sheet metal panel 60 can have a double folded edge, 62, 64 with cross-over slots 66 and 68 formed therein to provide a self-contained self-threading and self-locking sheet metal nut of the invention.

To provide assembling adjustability of the front panel 70, the top edge is folded over for dressing as at 72 and the two thicknesses are then drilled or punched to provide an aperture 74, 76 that is larger than the body 78 of the sheet metal screw 80. Thus, when the body 78 of the sheet metal screw 80 is inserted into the thread-forming aperture 82 of the cross-over slot system 66, 68, the front sheet 70 can be adjusted for proper position or alignment before the screw 80 is finally snugged up. Thus, universal adjustability is provided, but at the expense of a non-fastening aperture, thus illustrating the inefficiency of the prior art as compared to the present invention.

The nut-in-tube embodiment of FIGURES 9 and 10

As shown in FIGURE 9, cross-over slots 90 and 92 are provided in the end of the tube 93 and thereafter the tube end is flattened as shown in FIGURE 10 to give a thread-forming aperture 94 as in the prior embodiments of the invention.

It is believed that an obvious advantage of the latitude of the invention has been shown by the prior embodiments. However, this becomes particularly evident by reference to FIGURES 9 and 10. Thus, there is a substantial range of tolerance between the misalignment of the slots 90 and 92, and as long as the slots 90 and 92 cross over each other at some point in their length, the thread-forming aperture 94 will be provided. Thus, the wide adjustability of FIGURES 4 and 5 is inherent in the formation of individual nuts of the present invention and the tolerance factor or slop that can be permitted in forming the slots is also evident. The length of the slots gives a tremendous amount of adjustability and accommodation of manufacturing tolerances such as parts variations and placement of the slots and yet provides a very effective fastener which, as long as an aperture is provided by alignment of the slots, requires no threading and presents a self-locking nut.

The embodiment of FIGURE 11

Where it is desired to provide a nut in the end of an angle iron as for forming a brace or the like, the slots 96 and 98 are formed near the end and then the arms 100 and 102 of the angle are bent together in the manner of FIGURE 10 to form a thread-forming aperture and at the same time the fold over can be given an appropriate angular configuration with respect to the rest of the angle iron to form a suitable brace.

The strip nut concept

As regards the embodiment of FIGURE 11, this is also illustrative of the formation of a so-called strip nut. Thus, if we visualize the slots 96, 98 being formed at spaced intervals all along the length of an elongated strip of stock which is then folded upon itself as at 100 and 102, a strip nut of great versatility is provided that can be used in straight, curved or other desired configuration. When the halves 100 and 102 are folded upon one another, the nut is automatically formed by superimposing the slots 96, 98.

The clip-on nut of FIGURE 12

FIGURE 12 illustrates an individual nut of the invention that is provided with a dimple at 103, extending around the slot 104 in the lower leg 105 of the nut. The slot 106 formed in the upper leg 108 is angularly oriented as previously described.

By so operating, a clip-on unit is provided that is adapted to fit over one or more sheets of metal for temporarily holding them before a screw or bolt is inserted for final assembly.

The aligned aperture modification of invention

As shown in FIGURE 13, a very effective sheet metal nut can also be made in accordance with the broad principles of the present invention by folding a tab 10 from a sheet of metal 112 and thereafter providing an aperture 114 through both thicknesses of stock as by punching or drilling. This embodiment of the invention is illustrated in FIGURE 14 in three thicknesses, utilizing tabs 132, 134 and 136 from a sheet 138 and after folding the tabs, providing an aperture 130 as by punching, drilling or the like. When a sheet metal screw of appropriate fit is passed into this stacked array of metal sheets, an unexpectedly good nut is provided that readily self-threads and has very excellent self-locking action.

Extended scope of invention

While the foregoing description has shown sheet metal nuts formed integrally in a sheet of larger material, which the nut is adapted to secure in assembled relationship with another sheet of material or frame member, it will be obvious that individual nuts can be formed in accordance with the present invention, as for example by punching the folded unit from the sheet 10 as in FIGURE 2. Or, strip, tube or angle stock could be slotted, then folded or flattened and then severed at intervals to chop off the nuts formed by superpositioning of the slots on one another from two or more thicknesses of material. This same comment applies to the aligned aperture form of FIGURES 13 and 14.

Also, it is to be considered within the scope of the invention to slot individual squares of metal and then secure them one upon the other as by spot welding, brazing or the like to form individual nuts; or to position a small slotted tab over a slot formed in a large sheet of material. Thus, illustratively speaking, the tab 62 on the backside of the folded edge 64 of FIGURE 8 can be a separate piece and still form a nut in accordance with the present concept.

Although the foregoing description has related to the slots being at 90° or 60° angular relationship, it is to be included within the broad scope of the invention that any angular relationship can be utilized as long as a thread-forming aperture is provided as a result of the slots crossing upon one another.

While the foregoing disclosure has been concerned with the discussion of sheet metal panels, the invention is not to be limited to steel. Thus, the present invention is broadly applicable to the production of laminated nuts from ductile materials of the nature of auto body steel; therefore, copper, brass, steel and plastics, such as nylon and the like, would be applicable to the invention, both as regards their fastening together and to their use in the formation of individual nuts.

Also, the foregoing description has been directed to slots and the drawings show the slots as having straight sides. However, the broad scope of invention would include slots of elongated, oval configuration, i.e., where the sides are slightly curved and yet provide a thread gripping surface for a screw or bolt when crossed over one another in superimposed relation.

*General discussion*

The inherent self-locking feature of the present invention has been alluded to above. However, further elucidation upon this aspect of the invention may be provided by stating that the exposed raw edges be it 4, 6 or more in the thread forming aperture, provided by superimposing the slotted thicknesses of metal one upon the other, are subject to deformation and locking against each other when the screw is inserted.

The holding power of the present invention is believed to be demonstrated by the fact that a present automobile sheet metal fastener utilizes a round nut with one flat segment, peened over in a corresponding aperture in a sheet metal panel. A given torque on a 5/16 bolt caused the nut to be turned in its opening, rendering it useless. In contrast, the slot theory of the present invention held with a 5/16 sheet metal screw at a higher torque reading than the 5/16 bolt. Thus, in addition to being greatly cheaper than the current art, the present invention provides unexpectedly higher holding power.

The holding power of the present invention is further demonstrated by the fact that in the aligned aperture embodiment of FIGURES 12 and 13, using two thicknesses of 17 gauge body metal, a 5/16 sheet metal screw was actually twisted off by the high torque provided. The two sheets of metal were extremely effectively locked one to the other. Also, the cross-over slot idea has such great holding power that screws can be twisted off without stripping threads. At least this has been found true where 17 gauge body metal and a 5/16 sheet metal screw are used in combination. 17 gauge metal is commonly used for stiffening ribs and reinforcement underneath bodies of automobiles and thus, the fastening of sheet metal panels to such members with the nut of the present invention will provide tremendous holding power.

As regards the double and triple thickness nuts of the present invention, it will be obvious that the thinner the metal the greater the need for a third or fourth tab thickness. In heavy stock, two thicknesses are sufficient however for adequate holding in substantially any application.

The nuts of the present invention are applicable to use with self-threading sheet metal screws as well as regular sheet metal screws; the self-tapping sheet metal screws have closer and finer threads than the regular screws, as is known.

It is the theory of the present invention that the bight of the sheet metal screw, and the qualities of the crossover slots depend on two important factors: (1) The width of the slots should be slightly less than the diameter of the sheet metal screw used. (2) The combined thicknesses of one or more folds in the multi-folded sheet metal is preferably greater by a few thousandths than the lead or space provided between two threads at the minor diameter of the sheet metal screw.

Having thus described my invention, I claim:

1. A ductile sheet having a screw receiving fastener formed therein in combination with a screw having a thread and a lead and having a greater hardness than the sheet, the screw receiving fastener comprising a pierced tab consisting of a portion of the sheet and folded over to lie adjacent and parallel to the sheet, the tab and the adjacent portion of the sheet having pre-punched superimposed crossover slots arranged at an angle of at least sixty degrees with respect to each other and of a width slightly less than the major diameter of the screw thread, and the sheet being of a thickness slightly greater than half the lead of the screw.

2. In a method of forming a self-locking fastener from ductile sheet material for use with a threaded screw having a diameter and a lead, the sheet having a thickness of approximately half the lead of the screw, the steps of punching the sheet to form two separate spaced apart angularly related slots in the sheet of ductile material, said slots being arranged at an angle of not less than sixty degrees or more than ninety degrees relative to each other, the slots being of a width slightly less than the thread diameter of the screw, piercing the ductile material to provide a foldable tab having one of said slots therein, and folding the tab over the body of the sheet to superimpose the slots in angularly related crossover relation relative to each other.

3. The method of forming a screw thread receiving fastener in a sheet metal panel comprising the steps of punching the sheet to form spaced apart angularly related slots in the sheet metal panel, the slots being of a width slightly less than the thread diameter of the screw, piercing a foldable tab surrounding one of said slots, folding the pierced tab by bending the unpierced metal between the tab and the panel to position the tab to overlie the panel with the slot in the tab overlying and being disposed at an angle of not less than sixty degrees nor more than ninety degrees relative to the slot in the panel, and flattening the pierced tab to lie closely adjacent to and parallel with the surface of the panel to provide a threaded screw receiving aperture defined by the angularly related slots.

4. A sheet metal panel having a multi-thickness fastener formed therein in combination with a threaded screw fastener having a thread and a lead and having a greater hardness than the panel comprising spaced apart angularly related slots in the panel, the slots being of a width slightly less than the major diameter of the screw thread, a foldable pierced tab in said panel and encompassing one of the slots and the other of said slots being in a portion of the panel adjacent to said foldable tab, said tab being bent to a folded position to dispose the slot in the tab to overlie the other slot in the panel and to be arranged thereto at an angle of at least sixty degrees, and said bent tab being flattened to lie closely adjacent to and parallel with the surface of the panel to provide a screw receiving aperture defined by the angularly related slots, the sheet metal panel being of a thickness slightly greater than half the lead of the screw.

5. A sheet metal panel having a multi-thickness fastener formed therein in combination with a threaded screw fastener having a thread and a lead and having a greater hardness than the panel comprising three spaced apart angularly related slots in the panel, the slots being of a width slightly less than the major diameter of the screw thread, two confronting foldable pierced tabs in said panel and each encompassing one of the slots and the third of said slots being in a portion of the panel between said confronting foldable tabs, said confronting tabs being bent to folded positions to dispose the slot in each of the confronting tabs to overlie the third slot in the panel and to be arranged thereto at angles of approximately sixty degrees, and said bent tabs being flattened to lie closely adjacent to and parallel with the surface of the panel to provide a screw receiving aperture defined by the angularly related slots, the total thickness of the panel and the two foldable tabs being slightly greater than the lead of the screw.

References Cited by the Examiner

UNITED STATES PATENTS

| | | | |
|---|---|---|---|
| 977,710 | 12/10 | Craig | 85—36 |
| 1,202,020 | 10/16 | Berkey | 85—32 |
| 1,599,692 | 9/26 | Trout | 189—20 |
| 1,917,570 | 7/33 | Barton. | |
| 2,355,115 | 8/44 | Schmidt | 85—33 |
| 2,746,780 | 5/56 | Comino. | |
| 2,988,951 | 6/61 | Bradner | 85—32 |

FOREIGN PATENTS

| | | |
|---|---|---|
| 311,687 | 10/29 | Great Britain. |
| 645,110 | 10/50 | Great Britain. |

EDWARD C. ALLEN, *Primary Examiner*.

CARL W. TOMLIN, *Examiner*.